Feb. 19, 1946.  A. G. BLANCHARD ET AL  2,395,212
AUTOMATIC CONTROL MECHANISM FOR PRESSURE VESSELS
Filed Feb. 20, 1941  5 Sheets-Sheet 1
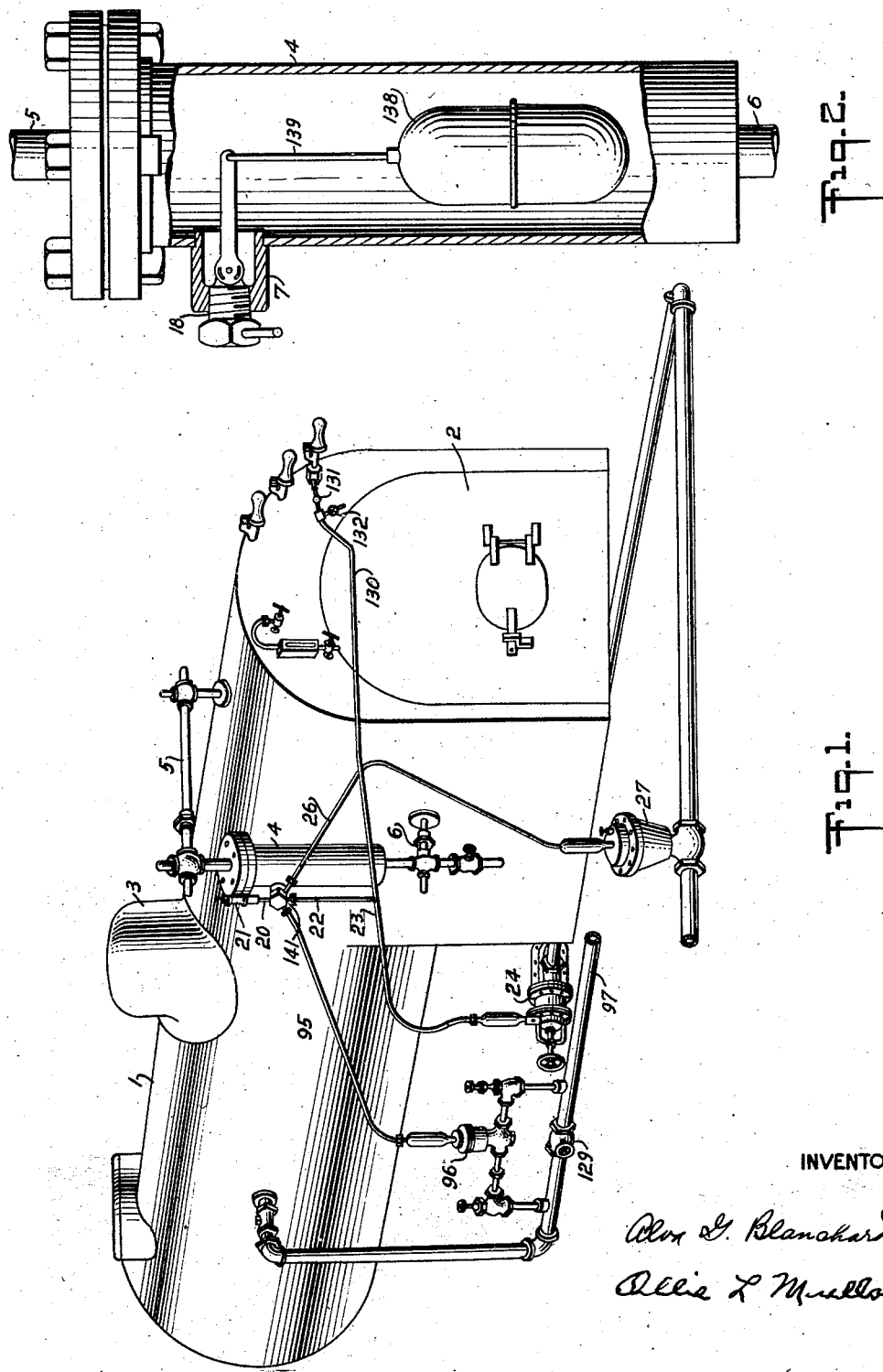
INVENTORS
Alva G. Blanchard
Allie L. Mulloy

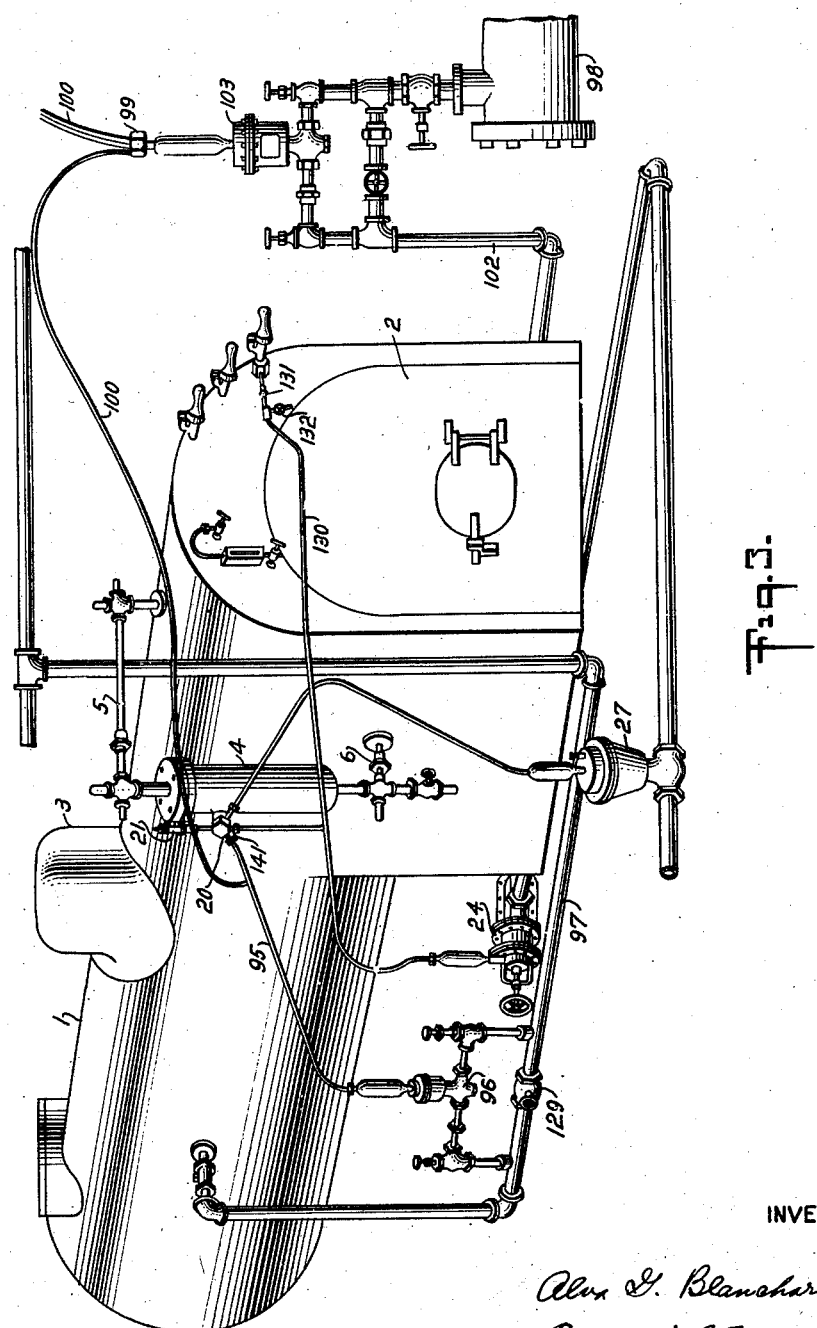

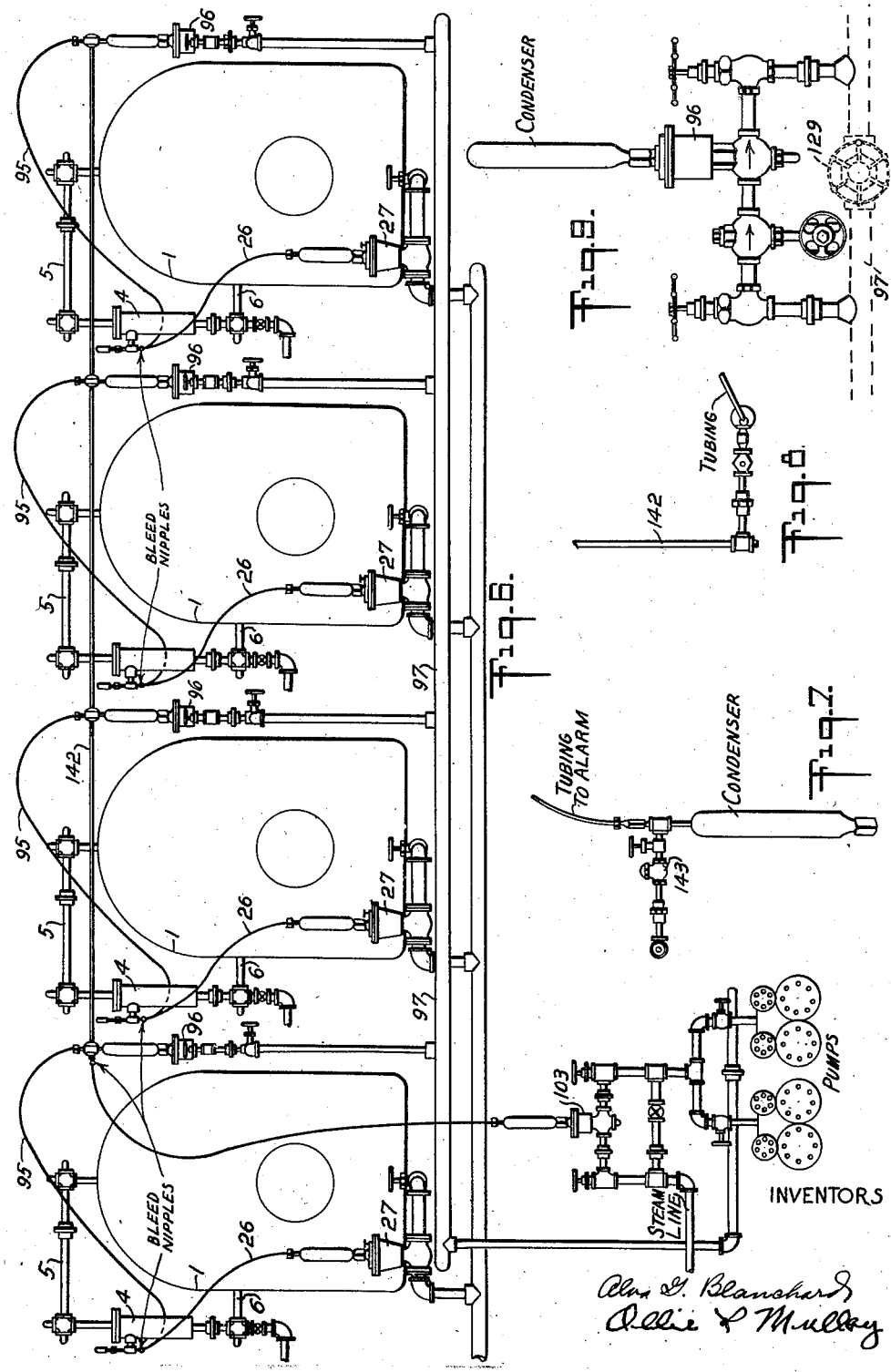

INVENTORS
Alva G. Blanchard
Ollie L. Mulkey

Patented Feb. 19, 1946

2,395,212

UNITED STATES PATENT OFFICE 2,395,212

AUTOMATIC CONTROL MECHANISM FOR PRESSURE VESSELS

Alva G. Blanchard and Ollie L. Mulloy, Shreveport, La.; said Mulloy assignor to said Blanchard Application February 20, 1941, Serial No. 379,822

7 Claims. (Cl. 122—451)

Our invention relates to steam boilers and pertains particularly to mechanism employed in connection therewith to control the water in use.

In the operation of steam boilers it is desirable to have connected therewith automatic mechanism for controlling the supply of water to the boiler or the fuel, or both, and to also provide for the blowoff of fluid from the boiler when said fluid becomes contaminated.

It is an object of our invention to provide an automatically operating valve or series of valves through which steam from the boiler may be directed to a plurality of steam operated devices for effecting the control of the water and fuel, or to operate other devices employed in connection with said boiler.

We further desire to provide, in connection with a plurality of boilers, for the common control of the water supply for all the boilers so that one pump may be used to furnish the water for each of the boilers when the occasion arises.

We have as a further object to provide an efficient type of compound valve which may effectively operate to deliver steam from a plurality of ports leading from the steam boiler.

The invention also includes an effective means of operating the individual valves in the boiler from a common float, said float being mounted to control the valves in a most effective manner.

The invention resides in the combination of the parts and their construction making up our improvement and attention is called to the drawings herewith wherein the several parts are disclosed.

In Fig. 1 we have shown a perspective view of a boiler to which the invention may be applied.

Fig. 2 is a side view partly in section illustrating the connection of the float with the valve operating lever.

Fig. 3 is a view similar to Fig. 1 but showing the connection with the boiler of a manifold whereby one pump may be employed in furnishing the water to a plurality of boilers.

Fig. 6 is a plan for a multiple boiler installation showing pump control valves, alarms, feed water valves and fuel cut off valves.

Fig. 7 is a side elevation detail of manifold connecting feed water valves together with the check valves separately attached instead of a single unit as shown in Fig. 5.

Fig. 8 is a plan view of Fig. 7.

Fig. 9 is a detail of the feed water valve mounted on a by pass around the main valve in the feed water line.

Figure 10:
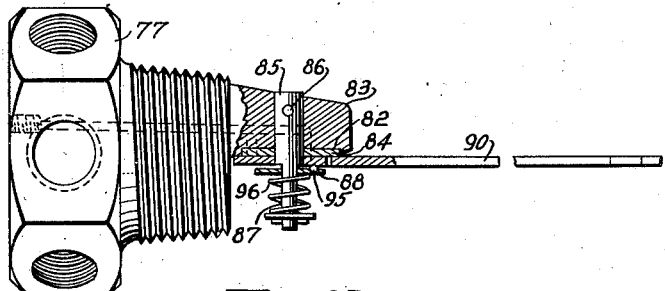
Fig. 10 is a top plan view partly in section of the valve controlling mechanism.
Figure 12:
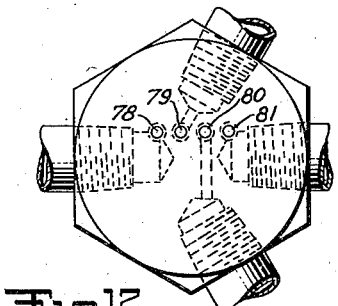
Fig. 12 is an end view of the valve plug shown in Fig. 10.

Our invention is adapted for application to any ordinary type of steam boiler. Fig. 1 we have shown a boiler 1 having the usual fire box 2 and steam chest 3 thereon. Connected with this boiler we provide a float chamber 4. This chamber may be located within the boiler. In the preferred embodiment, however, the float chamber is arranged outside the boiler and connected with the upper end of the boiler through a pipe 5. A lower pipe 6 connects with the boiler below the water line so that the chamber 4 will be filled with water to the same level as is the boiler.

With reference to Fig. 2, there is at one side of the valve chamber 4 a nipple 7 preferably welded within an opening in said chamber to hold said nipple securely in position and to provide a reliable seal against the leakage of steam therethrough. At the outer end of the nipple 7 is a threaded seat to receive a valve plug 18, which is screwed tightly therein.

The plug 18 has therethrough a plurality of passages for the outlet of steam from the boiler, each of said passages being connected with a fluid conducting pipe. With reference to Figs. 10, 11, 12, and 13 it will be seen that said plug 18 may have a plurality of outlets therethrough for the steam. One of said outlets 78 may be connected to a feed water valve 96. Another of said outlets 79 may be connected with an upwardly directed pipe 20 leading to a whistle 21. Another of said outlets 80 may be connected with a pipe 23 leading to the blowoff valve 24. The fourth outlet 81 may be connected with a pipe 26 leading to the fuel cutoff valve 27.

Figure 11:
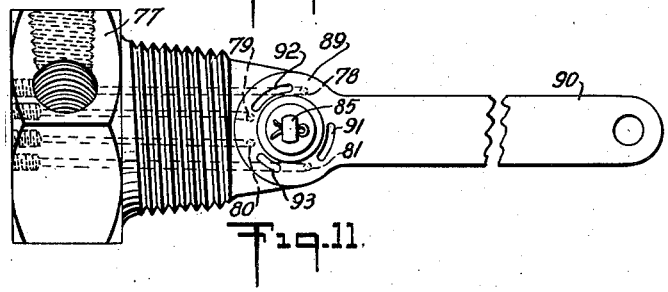
Fig. 11 is a side elevation of the Fig. 10 embodiment.

In Figs. 10 and 11 a type of valve for controlling the outlets through the valve plug is shown. In the embodiments shown in Figs. 10, 11 and 12 four separate outlets 78, 79, 80 and 81 are shown. These are parallel and in vertical alignment, as shown particularly in Fig. 11. Each of these extend from the outlets in the plug inwardly to issue from the flattened face 82 on the inner end of the plug. To provide the face 82 there is an inner extension 83 formed on the plug, one side of which is flattened and recessed to receive a face plate 84. Each of the passages extend through the body of the plug and into the extension 83 and are then directed laterally through the face plate 84, the outer surface of which forms a valve seat. As will be seen from Fig. 11, the openings from the separate passages issue from the face plate in a circular alignment about a pin or shaft 85 extending through the extension 83.

With reference to the shaft 85, said shaft is fixed against rotation in the plug extension by a pin 86. The projecting end of the pin is flattened on both sides, as shown at 87 and upon the flattened portion of the pin is mounted a washer 88, which is thus fixed against rotation on the pin.

Figure 13:
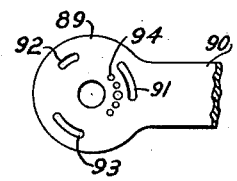
Fig. 13 is a broken detail of the inner end of the valve operating lever shown in Fig. 11.
Figure 14:
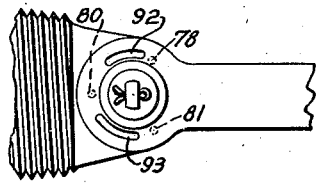
Fig. 14 is a broken detail showing a different valve controlling structure.

Between the washer 88 and the face plate 82 is the head 89 of the lever 90. Said lever is formed of a plate of metal and the head 89 engages rotatably about the rounded portion of the pin or shaft 85 and is rotatably thereon. Arcuate openings 91, 92 and 93 are formed in the head of the lever to cooperate with the openings 78 to 81, inclusive. The washer 88 is held resiliently into contact with the lever 90 and in order to cause said lever to move abruptly from one position to another a series of notches shown at 94 in Fig. 13 are formed on the surface of the head 89 of the lever which cooperates with the inner surface of the washer. In said washer is a recess having therein a ball 95 positioned to engage within one of the said notches 94. The spring 96 on the shaft holds the washer 88 resiliently toward the lever arm 80.

Thus when in operation the lever arm is normally in the horizontal position as shown in Fig. 11, and is held in that position by the float. When the float drops, however, due to the lowering of the level of the liquid in the chamber the opening 92 is brought over the opening 78 which allows the steam to pass through said openings and the passage 78 and outwardly through a pipe 95 to the feedwater control valve 96, shown in Fig. 1. In the event of a failure of the water supply a further downward movement of the lever will bring the opening 91 over the outlet passage 81 furnishing steam to the whistle. Still further downward movement will bring the opening 93 into registration with the outlet 80 and fluid will pass through said outlet 80 to the fuel cutoff valve 27 previously noted, and thus close off the fuel. When the lever 90 is moved upwardly by the raising of the level of the liquid in the float chamber the opening 92 will be brought into registration with the passage 79 leading to the blowoff valve 24, as previously described.

It will thus be seen that with this mechanism the passage of steam from the boiler through four separate passages may be regulated so that said passages will be opened for the flow of steam therethrough at the proper time, depending upon the level of the liquid in the boiler.

Figure 15:
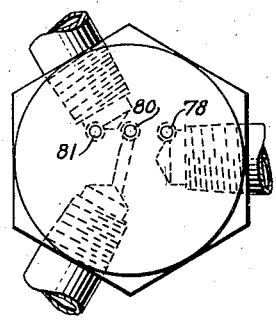
Fig. 15 is an end view of the valve plug which may be employed with the Fig. 14 embodiment.

If only three outlets are provided from the boiler, as shown in Fig. 15, it will be obvious that said outlets may be arranged to communicate with openings on the inner face of the extension 83 arranged in a manner shown in Fig. 11. In this case the opening 78, the opening 80, and the opening 81 are arranged in the same relative positions as in the Fig. 11 embodiment and these openings will be normally closed. They will, however, be opened for the passage of steam therethrough when the arcuate slots 92 and 93 are brought into registration therewith in an obvious manner.

It is possible to furnish feed water to the boilers under control of the feedwater valve 96 on a plurality of boilers simultaneously. In such arrangement the feed water line is indicated at 97, said feed water line being connected with the pump which is indicated at 98 in Fig. 3. It will be understood that a number of other lines may be connected with this same pump, each line leading to a separate boiler. The control of the pump to operate the same to force water under pressure to any particular boiler is arranged through a manifold shown at 99 in Fig. 3. Said manifold has a separate pipe or tube 100 thereon leading to the pipe 95 which is in turn connected with the feed water control valve.

Figure 5:
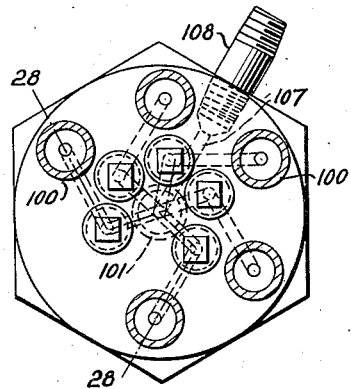
Fig. 5 is a top plan view of a manifold employed in directing steam from a plurality of different boilers to the pump for the automatic operation thereof.
Figure 4:
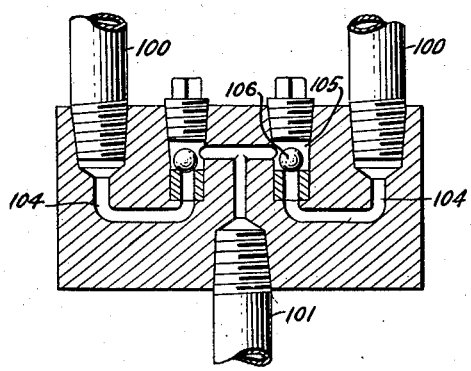
Fig. 4 is a transverse section on the plane 28—28 of Fig. 5.

Referring particularly to Figs. 4 and 5, the construction of the manifold will be noted. A pipe from each of the boilers is directed through the manifold to a pipe 101 leading to the valve which controls the passage of steam from the boiler through the pipe 102 past the control valve 103 to the pump 98. The control valve 103 is hence operated when steam is forced therethrough through any one of a plurality of pipes 100. In Figs. 4 and 5 there are a plurality of pipes 100, each of which may be understood as being connected with a steam boiler. Each pipe leads through a passage 104 and through a valve chamber 105 to the pipe 101 which leads to the control valve 103. Steam may hence pass to any one of the pipes 100 to the control valve whenever the float control valves within the valve chamber 4 is opened to the feed water control. The valves 106 in the valve chamber 105 allow a passage of steam to the control valve 103 but prevent its passage outwardly therethrough to the control valve 103 on any of the adjacent boilers. In Fig. 5 we have shown that each of the outlets may be connected with the bleed opening 107 leading to a discharge bleed nipple 108 through which fluid from the cylinder head of the control valve 103 and the feed water valve 96 may bleed off after the pump control valve 103 has been operated to supply the required amount of water to the boiler. The hole in the bleed nipple 108 must be less than the size of the opening 78 in the plug 77 in order that sufficient pressure will build up in the cylinder head of the feed water valve 96 and the control valve 103 and force them open. When the desired water level is reached the opening 78 is closed, cutting off the steam pressure. Before the feed water valve 96 and the control valve 103 can close, the fluid must exhaust through the bleed nipple 108. The valves 106 are to prevent pressure from one feed water valve line from going to the others and opening them when the boilers to which they are attached do not require water.

Figure 16:
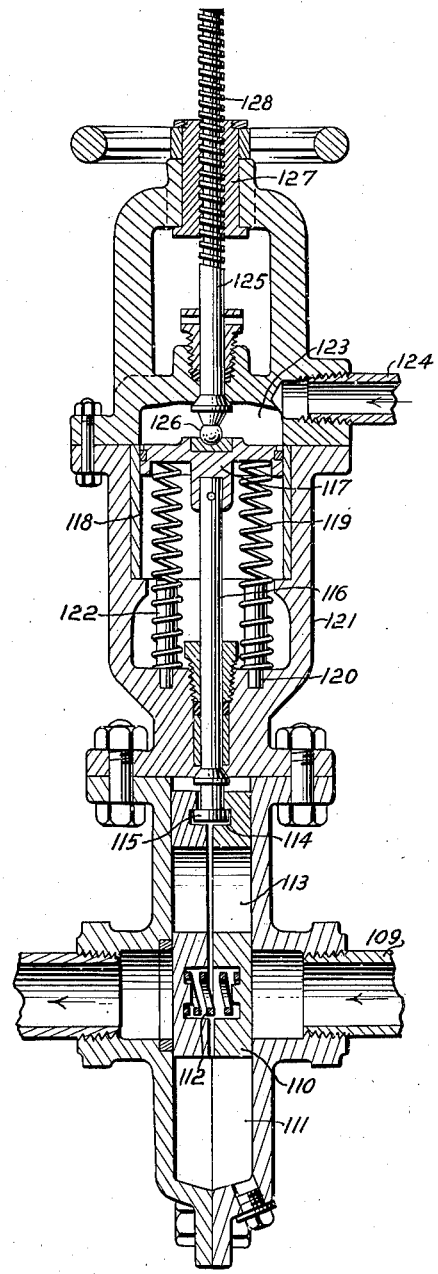
Fig. 16 is a longitudinal section on the plane 4—4 of Fig. 17.
Figure 17:
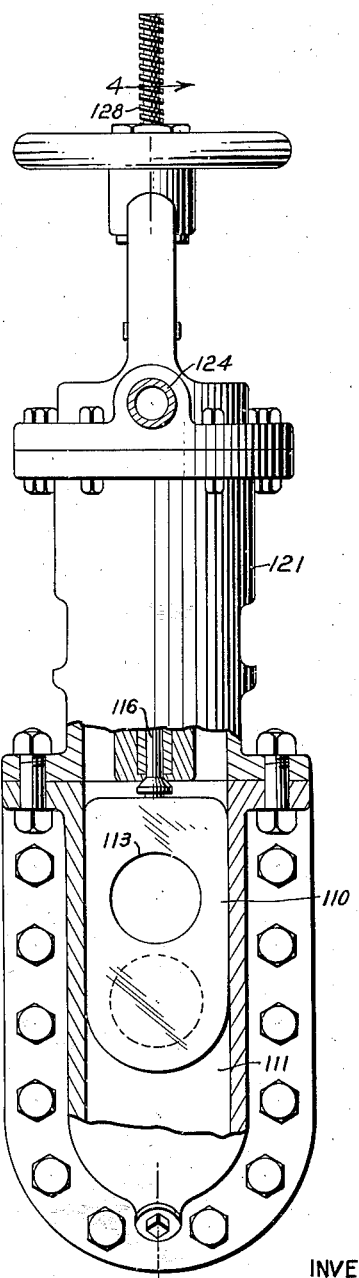
Fig. 17 is a side view taken at right angles to Fig. 16 showing a valve for controlling the passage of fluid in response to steam pressure or hand operation.

The structure of the blowoff valve, which is operated by steam from the boiler when the opening leading thereto is automatically opened, is shown in Figs. 16 and 17. This valve is operwithin each boiler will operate said series of openings in a predetermined order whereby fluid pressure is furnished to operate said normally closed power actuated steam valve to pump, said normally closed power actuated feed water valve, a low water alarm, said normally open power actuated fuel cut off valve, a high water alarm and said normally closed power actuated blow off valve.

2. A multiple steam boiler generating plant, a water pump for said plant controlled by a normally closed power actuated steam valve, a fluid conducting line to said normally closed power actuated steam valve to open same, a bleed opening in said fluid conducting line whereby said power actuated steam valve may close when the main source of fluid pressure through said fluid conducting line is removed, a feed water line from said pump to each boiler, a normally closed feed water power actuated valve in said line to each boiler, a pressure fluid conducting line to each feed water power actuated valve, a header connecting each fluid conducting line from each feed water power actuated valve together, a non return means between each of said fluid conducting lines and said header, said fluid conducting line to operate said normally closed power actuated steam valve to pump being connected to said header, whereby the normally closed power actuated steam valve to the pump will be opened whenever a normally closed power actuated feed water valve is opened, and by the same source of pressure.

3. A multiple steam boiler generating plant, a water pump for said plant controlled by a normally closed power actuated steam valve, a normally closed power actuated blow down valve, attached to each boiler, a normally closed power actuated feed water valve in the feed water line to each boiler, a series of valves actuated by floats responsive to the water level in each boiler whereby a lowering of the water level in each boiler will open one valve furnishing pressure to open said feed water valve attached to each boiler and the pump control valve, a manifold connecting said feed water valves to the pump control valve that will permit any feed water valve and the pump control valve to open without opening any of the other feed water valves, and, whereby the raising of the water level in any boiler above a predetermined level the float mechanism will supply steam to the power actuated blow down valve, opening same to lower the water level and a bleed opening in the line leading to the blow down valve whereby the pressure opening the normally closed blow down valve will escape thus permitting the blow down valve to close.

4. A boiler, a water pump controlled by a normally closed power actuated steam valve, a normally closed power actuated blow down valve, a multiple valve actuated by a float responsive to the water level whereby a lowering of the water level will open one valve furnishing pressure to open said pump control valve, a bleed opening in the line to the pump control valve to permit said valve to close when the water level within the boiler is raised and the float actuated valve is closed, said multiple valve including means responsive to the raising of the water level in the boiler above a predetermined level so that the float mechanism will supply steam to the power actuated blow down valve, opening same to lower the water level, and a bleed opening in the line leading to the blow down valve whereby the pressure opening the normally closed blow down valve will escape thus permitting the blow down valve to close.

5. A steam boiler generator, a blow off line, a normally closed power actuated blow off valve in said line, a fluid pressure conducting line to said valve, a bleed opening in said fluid pressure conducting line whereby said valve will be opened by an excess of fluid pressure through said conducting line and closed when said excess of fluid pressure is removed.

6. In a device of the character described, a steam operated pump, a steam pressure controlled valve in the steam line leading to said pump, a manifold, a plurality of steam conducting tubes from a plurality of boilers leading to said manifold, an outlet from said manifold to said valve to conduct steam thereto for opening said steam line, each of said tubes being connected with said manifold outlet, and a valve in each tube connection to prevent flow of fluid outwardly from said manifold.

7. In a device of the character described, a steam operated pump, a steam pressure controlled valve in the steam line leading to said pump, a manifold, a plurality of steam conducting tubes from a plurality of boilers leading to said manifold, an outlet from said manifold to said valve to conduct steam thereto for opening said steam line, each of said tubes being connected with said manifold outlet, and a valve in each tube connection to prevent flow of fluid outwardly from said manifold and a bleed passage from said outlet to release fluid pressure when said steam is not flowing in one of said tubes.

ALVA G. BLANCHARD.
OLLIE L. MULLOY.